United States Patent
Kodama et al.

(10) Patent No.: US 8,078,017 B2
(45) Date of Patent: Dec. 13, 2011

(54) METHOD FOR MANUFACTURING OPTICAL INTERFACE MODULE AND OPTICAL INTERFACE MODULE

(75) Inventors: Hiroaki Kodama, Gifu (JP); Kensaku Nakashima, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 372 days.

(21) Appl. No.: 12/501,962

(22) Filed: Jul. 13, 2009

(65) Prior Publication Data
US 2010/0014803 A1    Jan. 21, 2010

Related U.S. Application Data

(60) Provisional application No. 61/081,182, filed on Jul. 16, 2008.

(51) Int. Cl.
*G02B 6/12*    (2006.01)
*B29D 11/00*    (2006.01)

(52) U.S. Cl. .................................... 385/14; 264/1.27

(58) Field of Classification Search ................. 65/392; 216/24; 264/1.27; 385/14
See application file for complete search history.

(56) References Cited

FOREIGN PATENT DOCUMENTS
JP    8-36122    2/1996
JP    8-36133    2/1996

*Primary Examiner* — Omar Rojas
(74) *Attorney, Agent, or Firm* — Oblon, Spivak, McClelland, Maier & Neustadt, L.L.P.

(57) ABSTRACT

An optical interface module and a method for manufacturing an optical interface module. One method includes forming a lower clad layer on a first surface of a substrate, forming a core layer on the lower clad layer and forming two grooves in part of the core layer to form a first core part between the two grooves having one end and another end. Also included is forming an upper clad layer on the core layer and in the grooves, mounting a light-emitting element on the first surface and mounting a light-receiving element on the first surface of the substrate. A second core part is optically coupled to the light-emitting element and the first core part, and a third core part is optically coupled to the light-receiving element and the other end of the first core part.

20 Claims, 10 Drawing Sheets

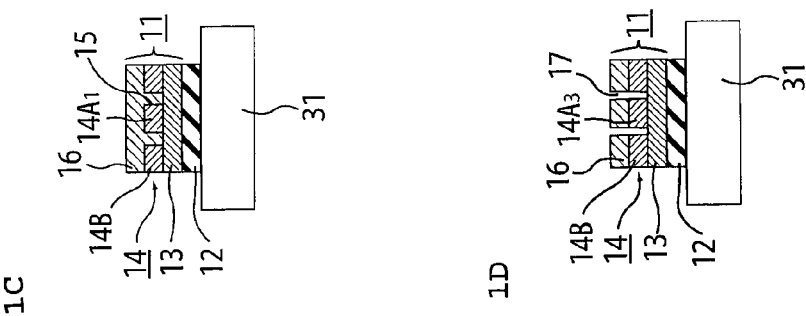
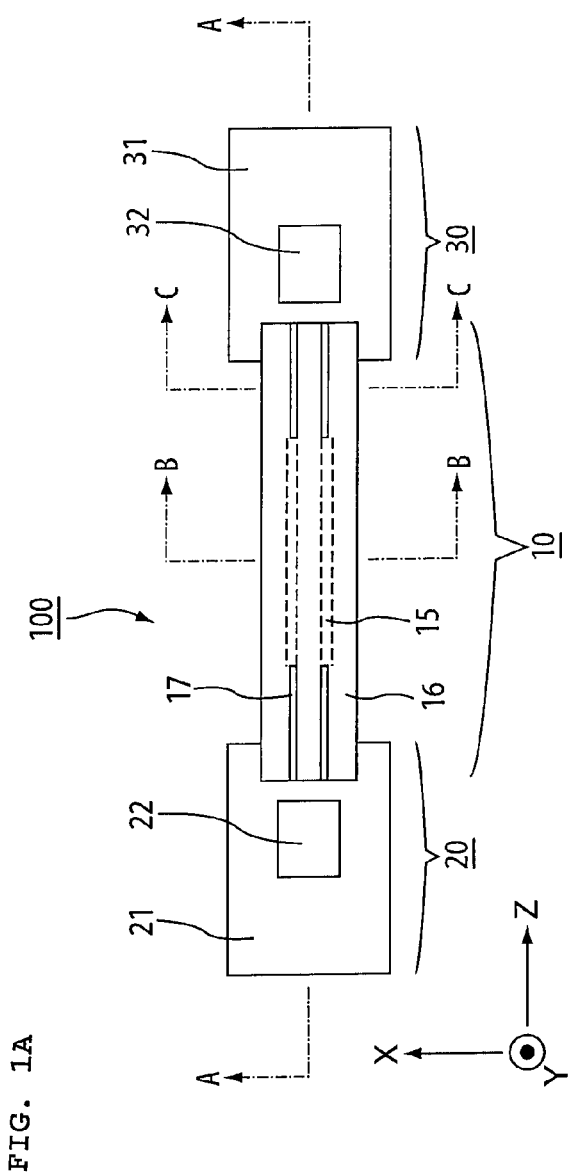
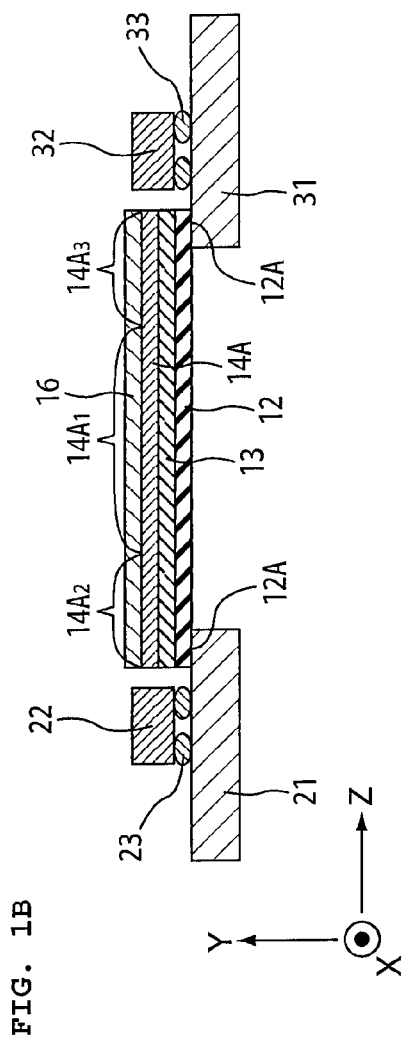

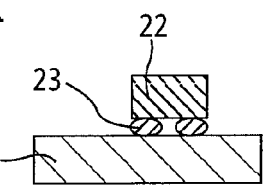
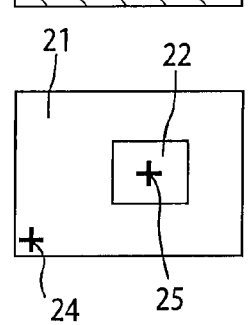
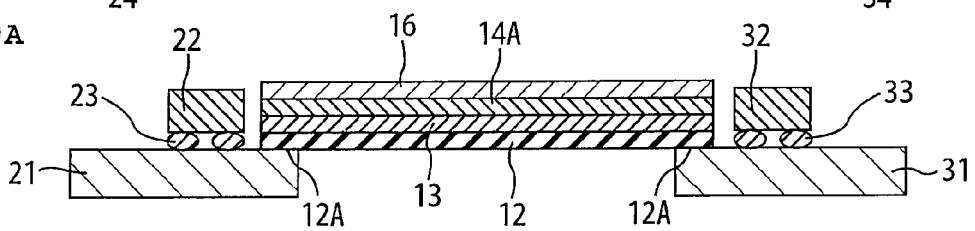
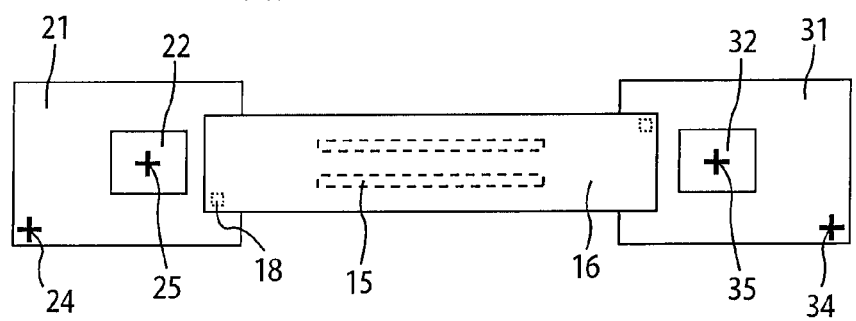
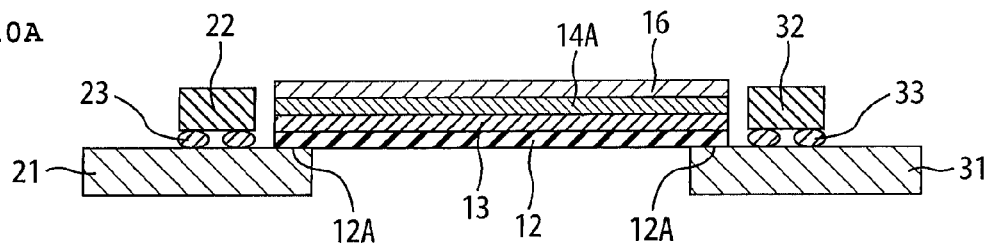
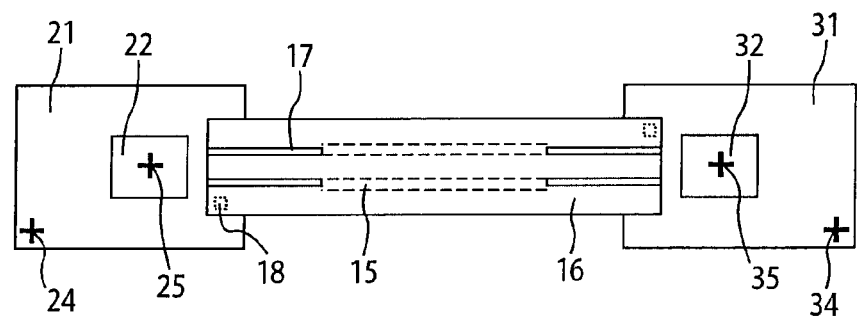

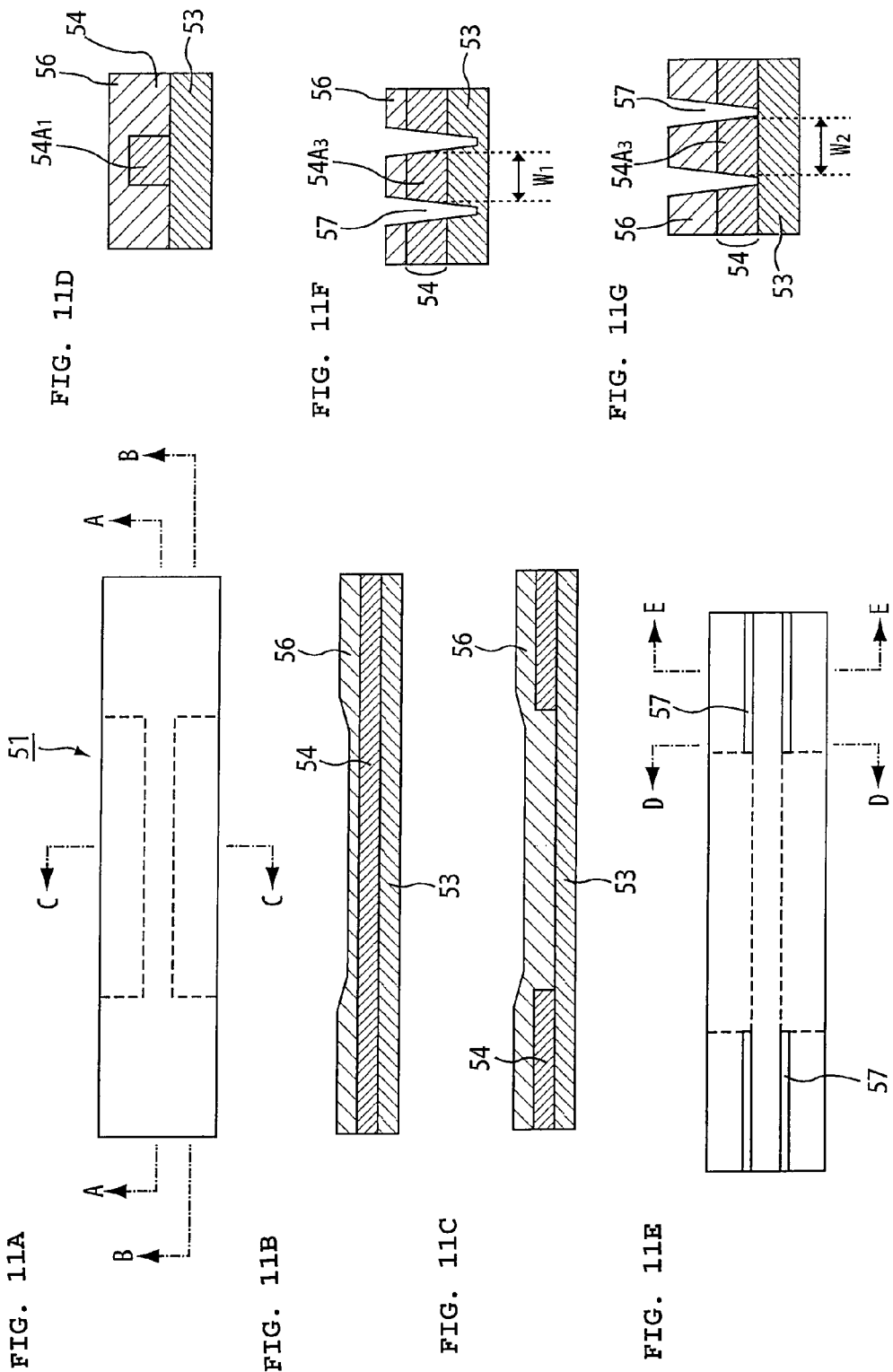

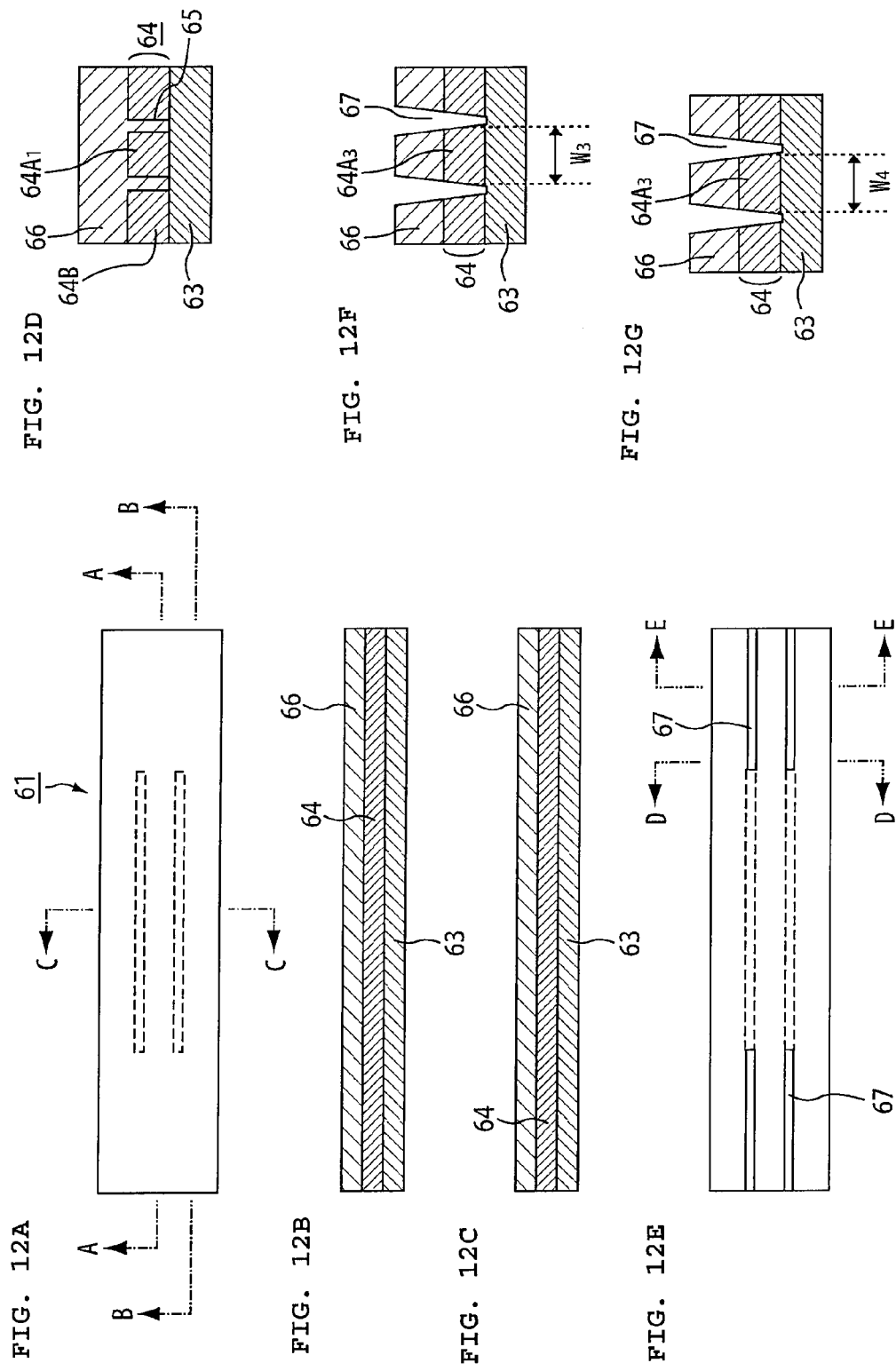

METHOD FOR MANUFACTURING OPTICAL INTERFACE MODULE AND OPTICAL INTERFACE MODULE

CROSS-REFERENCE TO RELATED APPLICATIONS

The present application claims the benefits of priority to U.S. Application No. 61/081,182, filed Jul. 16, 2008. The contents of that application are incorporated herein by reference in their entirety.

BACKGROUND

1. Technical Field

The present invention is related to a method for manufacturing an optical interface module and to an optical interface module.

2. Description of Related Art

Since an optical interface module is suitable for high-speed signal transmission and is easy to design as noise resistant and so forth, it has been suggested recently that an optical interface module be used in lieu of a printed wiring board where conductive circuits made of copper are formed on a substrate. In an optical interface module, optical elements such as a light-emitting element and a light-receiving element are mounted on a substrate, and an optical waveguide is also formed so that signal transmission is conducted through the optical waveguide.

In such an optical interface module, to reduce transmission loss of optical signals and to ensure transmission of optical signals, it is desirable that a light-emitting element and a light-receiving element be accurately aligned with an optical waveguide.

Thus, for example, in Japanese Laid-Open Patent Publication H8-36122, to reduce the connection loss between an optical element and an optical waveguide, technology is disclosed where either an optical element or an optical waveguide is mechanically shifted according to the size of the gap so as to align them both. The contents of these publications (this publication) are incorporated herein by reference in their entirety.

SUMMARY

A method for manufacturing an optical interface module, including forming a lower clad layer on a first surface of a substrate, which is opposite to a second surface of the substrate, forming a core layer on the lower clad layer, forming a first core part having one end and an other end by forming a first set of two grooves in a part of the core layer, the first core part being between the two grooves, forming an upper clad layer on the core layer and in the first set of two grooves, mounting a light-emitting element on a first extended portion of the first surface of the substrate, mounting a light-receiving element on a second extended portion of the first surface of the substrate, forming a second core part which is optically coupled to the light-emitting element and to the one end of the first core part respectively, by forming a second set of two grooves by laser processing in the upper clad layer and the core layer between the light-emitting element and the one end of the first core part, and forming a third core part which is optically coupled to the light-receiving element and the other end of the first core part respectively, by forming a third set of two grooves by laser processing in the upper clad layer and the core layer between the light-receiving element and the other end of the first core part.

A method for manufacturing an optical interface module, including forming a lower clad layer on a flexible substrate, forming a core layer on the lower clad layer, forming a first core part having one end and an other end by forming a first set of two grooves in a part of the core layer, the first core part being between the two grooves, forming an upper clad layer on the core layer and in the first set of two grooves, mounting a light-emitting element on a first rigid substrate, mounting a light-receiving element on a second rigid substrate, adhering the first rigid substrate and the second rigid substrate to the flexible substrate, forming a second core part which is optically coupled to the light-emitting element and to the one end of the first core part respectively by forming a second set of two grooves by laser processing in the upper clad layer and the core layer between the light-emitting element and the one end of the first core part, and forming a third core part which is optically coupled to the light-receiving element and the other end of the first core part respectively by forming a third set of two grooves by laser processing in the upper clad layer and the core layer between the light-receiving element and the other end of the first core part.

An optical interface module, including a substrate, a lower clad layer formed on the substrate, a three-dimensional core section formed on the lower clad layer and having a first sidewall and a second sidewall opposite to the first sidewall, a first resin layer formed on the lower clad layer along the first sidewall of the core section and not touching the first sidewall so as to form a first gap, a second resin layer formed on the lower clad layer along the second sidewall of the core section and not touching the second sidewall so as to form a second gap, an upper clad layer formed on the core section, on the first resin layer, on the second resin layer, in at least part of the first gap between the core section and the first resin layer, and in at least part of the second gap between the core section and the second resin layer, a light-emitting element mounted on a first extended portion of the substrate and optically coupled to the core section, and a light-receiving element mounted on a second extended portion of the substrate and optically coupled to the core section, wherein the core section comprises a first core part, a second core part and a third core part, the first core part being between the second core part and the third core part, and a transmission loss in a unit length of the first core part is smaller than a transmission loss in a unit length of the second core part and in a unit length of the third core part.

An optical interface module, including a flexible substrate, a lower clad layer formed on the flexible substrate, a three-dimensional core section which is formed on the lower clad section and having a first sidewall and a second sidewall opposite the first sidewall, a first resin layer formed on the lower clad layer along the first sidewall of the core section and not touching the first sidewall so as to form a first gap, a second resin layer formed on the lower clad layer along the second sidewall of the core section and not touching the second sidewall so as to form a second gap, an upper clad layer formed on the core section, on the first resin layer, on the second resin layer, in at least part of the first gap between the core section and the first resin layer, and in at least part of the second gap between the core section and the second resin layer, a first rigid substrate, a light-emitting element mounted on the first rigid substrate, a second rigid substrate, and a light-receiving element mounted on the second rigid substrate, wherein the flexible substrate is adhered to the first rigid substrate and to the second rigid substrate at opposite ends of the flexible substrate, the optical element and the light-receiving element are optically connected to the core section, the core section comprises a first core part, a second core part and a third core part, the first core part is sandwiched between the second core part and the third core part, and a transmission loss in a unit length of the first core part is smaller than a transmission loss in a unit length of the second core part and the third core part.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. (1A) is a plan view showing an optical interface module according to an example First Embodiment of the present invention;

Figure 2:
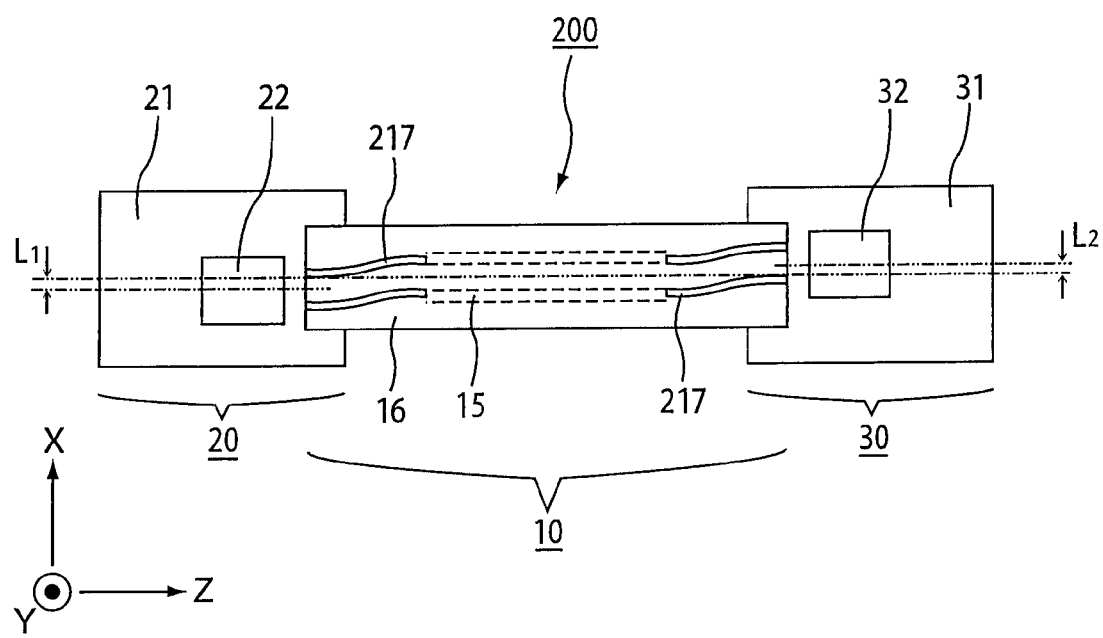

FIG. (1B) is a cross-sectional view of the example optical interface module seen from the A-A line in FIG. (1A);

FIG. (1C) is a cross-sectional view of the example optical interface module seen from the B-B line in FIG. (1A);

FIG. (1D) is a cross-sectional view of the example optical interface module seen from the C-C line in FIG. (1A).

FIG. (2) is a plan view showing another optical interface module according to the example First Embodiment of the present invention.

FIG. (3) is a cross-sectional view illustrating a manufacturing method according to the example First Embodiment of the present invention.

FIG. (4) is a cross-sectional view illustrating a manufacturing method according to the example First Embodiment of the present invention.

FIG. (5) is a cross-sectional view illustrating a manufacturing method according to the example First Embodiment of the present invention.

FIG. (6A) is a cross-sectional view illustrating a manufacturing method according to the example First Embodiment of the present invention;

FIG. (6B) is a cross-sectional view illustrating a manufacturing method according to the example First Embodiment of the present invention;

FIG. (6C) is a plan view illustrating a manufacturing method according to the example First Embodiment of the present invention.

FIG. (7A) is a cross-sectional view illustrating a manufacturing method according to the example First Embodiment of the present invention;

FIG. (7B) is a plan view illustrating a manufacturing method according to the example First Embodiment of the present invention;

FIG. (7C) is a cross-sectional view illustrating a manufacturing method according to the example First Embodiment of the present invention.

FIG. (8A) is a cross-sectional view illustrating a manufacturing method according to the example First Embodiment of the present invention;

FIG. (8B) is a plan view illustrating a manufacturing method according to the example First Embodiment of the present invention.

FIG. (9A) is a cross-sectional view illustrating a manufacturing method according to the example First Embodiment of the present invention;

FIG. (9B) is a plan view illustrating a manufacturing method according to the example First Embodiment of the present invention.

FIG. (10A) is a cross-sectional view illustrating a manufacturing method according to the example First Embodiment of the present invention;

FIG. (10B) is a plan view illustrating a manufacturing method according to the example First Embodiment of the present invention.

FIG. (11A) is a plan view showing an example laminate having a lower clad layer, a core layer where only a first core part is formed, and an upper clad layer;

FIG. (11B) is a cross-sectional view of the example laminate seen from the A-A line in FIG. (11A);

FIG. (11C) is a cross-sectional view of the example laminate seen from the B-B line in FIG. (11A);

FIG. (11D) is a cross-sectional view of the example laminate seen from the C-C line in FIG. (11A);

FIG. (11E) is a plan view showing an example optical waveguide where second and third cores are formed by forming two grooves through laser processing;

FIG. (11F) is a cross-sectional view of the example optical waveguide seen from the D-D line in FIG. (11E);

FIG. (11G) is a cross-sectional view of the example optical waveguide seen from the E-E line in FIG. (11E).

FIG. (12A) is a plan view showing an example laminate having a lower clad layer, a core layer where a first core part and dummy cores on both of its sides are formed, and an upper clad layer;

FIG. (12B) is a cross-sectional view of the example laminate seen from the A-A line in FIG. (12A);

FIG. (12C) is a cross-sectional view of the example laminate seen from the B-B line in FIG. (12A);

FIG. (12D) is a cross-sectional view of the example laminate seen from the C-C line in FIG. (12A);

FIG. (12E) is a plan view showing an example optical waveguide where second and third core parts are formed by forming two grooves through laser processing;

FIG. (12F) is a cross-sectional view of the example optical waveguide seen from the D-D line in FIG. (12E);

FIG. (12G) is a cross-sectional view of the example optical waveguide seen from the E-E line in FIG. (12E).

FIG. (13A) is a plan view showing an example optical interface module according to Comparative Example (1);

FIG. (13B) is a cross-sectional view of the example optical interface module seen from the B-B line in FIG. (13A);

FIG. (13C) is a cross-sectional view of the example optical interface module seen from the C-C line in FIG. (13A).

FIG. (14A) is a plan view showing an example optical interface module according to the Second Example of the present invention;

FIG. (14B) is a cross-sectional view of the example optical interface module seen from the A-A line in FIG. (14A);

FIG. (14C) is a cross-sectional view of the example optical interface module seen from the B-B line in FIG. (14A);

FIG. (14D) is a cross-sectional view of the example optical interface module seen from the C-C line in FIG. (14A).

FIG. (15) is a cross-sectional view showing another optical interface module according to an example Second Embodiment of the present invention.

FIG. (16) is a cross-sectional view showing yet another optical interface module according to the example Second Embodiment of the present invention.

DETAILED DESCRIPTION

As noted above H8-36133 discloses technology for aligning an optical element with an optical waveguide. However, the present inventors believe that mechanically shifting an optical waveguide (including an optical element) to conduct alignment complicates its design and increases the number of components.

The present invention was carried out to address or solve this problem. One objective is to provide a method for manufacturing an optical interface module which easily and securely connects a light-emitting element and a light-receiving element to an optical waveguide, and also to provide an optical interface module in which a light-emitting element and a light-receiving element are securely connected to an optical waveguide.

To achieve the above objective, a method for manufacturing an optical interface module according to the present invention is characterized by the following: a step to form a lower clad layer on a first surface of a substrate having a first surface and a second surface opposite the first surface; a step to form a core layer on the lower clad layer; by forming two grooves in part of the core layer, a step to form a first core part which is sandwiched by the two grooves and has one end and another end; a step to form an upper clad layer on the core layer and in the grooves; a step to mount a light-emitting element on the first surface of the substrate; a step to mount a light-receiving element on the first surface of the substrate; by forming two grooves by laser processing in the upper clad layer and the core layer between the light-emitting element and one end of the first core part, a step to form a second core part which is optically connected to the light-emitting element and that end of the first core part respectively; and by forming two grooves by laser processing in the upper clad layer and the core layer between the light-receiving element and the other end of the first core part, a step to form a third core part which is optically connected to the light-receiving element and the other end of the first core part respectively.

Also, to achieve the above objective, a method for manufacturing an optical interface module according to the present invention is characterized by the following: a step to form a lower clad layer on a flexible substrate; a step to form a core layer on the lower clad layer; by forming two grooves in part of the core layer, a step to form a first core part which is sandwiched by the two grooves and has one end and another end; a step to form an upper clad layer on the core layer and in the grooves; a step to mount a light-emitting element on a first rigid substrate; a step to mount a light-receiving element on a second rigid substrate; a step to adhere the first rigid substrate and the second rigid substrate to the flexible substrate; by forming two grooves by laser processing in the upper clad layer and the core layer between the light-emitting element and one end of the first core part, a step to form a second core part which is optically connected to the light-emitting element and to that end of the first core part respectively; and by forming two grooves by laser processing in the upper clad layer and the core layer between the light-receiving element and the other end of the first core part, a step to form a third core part which is optically connected to the light-receiving element and the other end of the first core part respectively.

Also, to achieve the above objective, an optical interface module of the present invention is characterized by the following: a substrate; a lower clad layer formed on the substrate; a three-dimensional core section which is formed on the lower clad section and has a first sidewall and a second sidewall opposite the first sidewall; a first resin layer formed on the lower clad layer along the first sidewall of the core section while not touching the first sidewall; a second resin layer formed on the lower clad layer along the second sidewall of the core section while not touching the second sidewall; an upper clad layer formed on the core section, on the first resin layer, on the second resin layer, in at least part of the gap between the core section and the first resin layer, and in at least part of the gap between the core section and the second resin layer; a light-emitting element mounted on the substrate and optically connected to the core section; and a light-receiving element mounted on the substrate and optically connected to the core section. Also, the core section is made up of a first core part, a second core part and a third core part; the first core part is sandwiched between the second core part and the third core part; and the transmission loss in a unit length of the first core part is smaller than the transmission loss in a unit length of the second core part and the third core part.

Also, to achieve the above objective, an optical interface module of the present invention is characterized by the following: a flexible substrate; a lower clad layer formed on the flexible substrate; a three-dimensional core section which is formed on the lower clad section and has a first sidewall and a second sidewall opposite the first sidewall; a first resin layer formed on the lower clad layer along the first sidewall of the core section while not touching the first sidewall; a second resin layer formed on the lower clad layer along the second sidewall of the core section while not touching the second sidewall; an upper clad layer formed on the core section, on the first resin layer, on the second resin layer, in at least part of the gap between the core section and the first resin layer, and in at least part of the gap between the core section and the second resin layer; a first rigid substrate; a light-emitting element mounted on the first rigid substrate; a second rigid substrate; and a light-receiving element mounted on the second rigid substrate. Also, the flexible substrate is adhered to the first rigid substrate and the second rigid substrate; the optical element and the light-receiving element are optically connected to the core section; the core section is made up of a first core part, a second core part and a third core part; the first core part is sandwiched between the second core part and the third core part; and the transmission loss in a unit length of the first core part is smaller than the transmission loss in a unit length of the second core part and the third core part.

In the present invention, "optically connected" indicates that those which are optically connected (for example, first core part and second core part, light-emitting element and second core part, and so forth) are in such a condition that optical signals may be transmitted between them. Therefore, as long as optical signal transmission is carried out between them, they may be positioned touching or not touching.

An objective of the present invention is to provide a method for manufacturing an optical interface module using a method to easily and securely connect a light-emitting element and a light-receiving element to an optical waveguide.

According to the method for manufacturing an optical interface module of the present invention, a light-emitting element and a light-receiving element are mounted first, and then the core section is completed based on the positions of the light-emitting element and the light-receiving element. Therefore, even if the mounted positions of a light-emitting element and a light-receiving element are significantly shifted from their designed positions, the core section may be formed with high alignment accuracy according to the actual mounted positions of the light-emitting element and the light-receiving element. Namely, an optical interface module may be manufactured in such a way that transmission loss of optical signals is low between a light-emitting element and a light-receiving element via the core section of an optical waveguide, even if the mounted positions of the light-emitting element and the light-receiving element are significantly shifted from the designed positions.

In an optical interface module of the present invention, at a side surface of the core section, a resin layer (dummy core), which in reality does not contribute to optical transmission, is formed without touching the sidewall of the core section.

Accordingly, the cross-sectional configuration (the cross-sectional configuration seen from a direction that makes a right angle to the optical transmitting direction) of the core section may be made substantially the same in the entire core section (first to third core parts), and the top surface of the optical waveguide may be made flat as well. As a result, transmission loss will be reduced. Furthermore, in the above optical interface module, the bit error rate of optical signals may be lowered, thus ensuring reliable signal transmission.

Also, in an optical interface module of the present invention, the transmission loss in a unit length of the first core part is less than the transmission loss in a unit length of the second core part and the third core part. Therefore, the ratio of the occupying areas between the first core part and the second and third core parts may be designed according to the transmission loss allowed for the entire optical interface module. Namely, if the transmission loss allowed for the entire optical interface module is small, the ratio that the first core part occupies may be enlarged. On the other hand, if the transmission loss allowed for the entire optical interface module is large, the ratio that the second core part and the third core part occupy may be set large.

In the present specification, sidewall of the core section indicates, among the side surfaces of the core section, the surface that excludes surfaces where light inputs or outputs.

The embodiments will now be described with reference to the accompanying drawings, wherein like reference numerals designate corresponding or identical elements throughout the various drawings.

In the following, an embodiment of the present invention is described.

First Embodiment

First, regarding an optical interface module according to an embodiment of the present invention, an optical interface module having a flexible substrate and first and second rigid substrates is described here with reference to the drawings. FIG. (1A) is a plan view of an optical interface module according to the First Embodiment of the present invention. FIG. (1B) is a cross-sectional view of the optical interface module seen from the A-A line in FIG. (1A); FIG. (1C) is a cross-sectional view of the optical interface module seen from the B-B line in FIG. (1A); and FIG. (1D) is a cross-sectional view of the optical interface module seen from the C-C line in FIG. (1A).

As shown in FIGS. (1A-1D), optical interface module (100) according to the First Embodiment has the following: optical wiring section (10) in which optical waveguide (11) is formed on flexible polyimide substrate (12) (flexible substrate (12)); light-emitting section (20) made up of rigid electrical substrate (21) (a first rigid substrate) where laser diode (22) is mounted; and light-receiving section (30) made up of rigid electrical substrate (31) (a second rigid substrate) where photodiode (32) is mounted.

In optical wiring section (10), optical waveguide (11) is formed on flexible polyimide substrate (12). Optical waveguide (11) has lower clad layer (13), core layer (14) and upper clad layer (16) which are made of resin, each layer being laminated on polyimide substrate (12) in that order. Furthermore, in optical waveguide (11), two parallel grooves (15, 17) are formed in part of core layer (14). In core layer (14), the area sandwiched by two grooves (15) and another area sandwiched by two grooves (17) make up core section (14A), which actually works as an optical path. More specifically, the area of the core section sandwiched by two grooves (15) is first core part ($14A_1$), and the area of the core sandwiched by two grooves (17) is second core part ($14A_2$) or third core part ($14A_3$). Also, in core layer (14), the areas outside grooves (15, 17) are resin layers (dummy cores) (14B) which are not actual optical paths. Therefore, dummy cores (14B) are formed along the sidewalls of core section (14A) without touching the sidewalls of core section (14A).

In grooves (15), resin is filled as shown in FIG. (1C) to form part of upper clad layer (16). Also, as shown in FIG. (1D), grooves (17) are empty and are formed to penetrate core layer (14) and upper clad layer (16). Here, resin may be filled in grooves (17).

Also, both ends (12A) on the lower surface of polyimide substrate (12) of optical wiring section (10) are anchored to rigid electrical substrate (21) of light-emitting section (20) and rigid electrical substrate (31) of light-receiving section (30) respectively by means of an adhesive layer (not shown in the drawing). Here, rigid electrical substrate (21) is anchored to polyimide substrate (12) so that the end of second core part ($14A_2$), which is on the side optically connected to laser diode (22) mounted on rigid electrical substrate (21), is positioned on rigid electrical substrate (21).

Also, rigid electrical substrate (31) is anchored to polyimide substrate (12) so that the end of third core part ($14A_3$), which is on the side optically connected to photodiode (32) mounted on rigid electrical substrate (31), is positioned on rigid electrical substrate (31). By anchoring rigid electrical substrates (21, 31) in such positions, optical signal transmission may be ensured between laser diode (22) and second core part ($14A_2$), and between third core part ($14A_3$) and photodiode (32). That is because even if polyimide substrate (12) (flexible substrate (12)) in an optical interface module is warped while in use, since rigid electrical substrates (21, 31) do not warp, the positions of the laser diode and photodiode relative to the core section will not change.

In light-emitting section (20), on rigid electrical substrate (21) which has electrical circuits, laser diode (22) is flip-chip mounted using solder bumps (23), and a driver circuit (driver), not shown in the drawings, of laser diode (22) is loaded as well. In light-receiving section (30), on rigid electrical substrate (31) which has electrical circuits, photodiode (32) is flip-chip mounted using solder bumps (33), and control circuits (preamplifier and comparator), not shown in the drawings, of photodiode (32) are loaded as well.

Also, in optical interface module (100), the roughness of the sidewalls of first core part ($14A_1$) is made less than the roughness of the sidewalls of second core part ($14A_2$) and third core part ($14A_3$). Accordingly, in optical interface module (100), transmission loss in a unit length of first core part ($14A_1$) is less than transmission loss in each unit length of second core part ($14A_2$) and third core part ($14A_3$). Therefore, when manufacturing optical interface module (100) using the below method, it is preferred that the length of first core part ($14A_1$) and each length of second core part ($14A_2$) and third core part ($14A_3$) be designed according to the transmission loss allowed for the entire optical interface module (100).

In such optical interface module (100), optical signals may be transmitted from laser diode (22) in light-emitting section (20) to photodiode (32) in light-receiving section (30) through optical waveguide (11) (core section (14A)).

Also, in optical interface module (100), polyimide substrate (12) may be a flexible electrical substrate which has electrical circuits. In such a case, rigid electrical substrate (21) and rigid electrical substrate (31) may also be connected electrically, while being optically connected through optical waveguide (11).

Also, in optical interface module (100) shown in FIG. (1), the entire core section (14A) is formed in a straight line.

However, part of the core section may be bent or curved. Namely, an optical interface module of the present invention may be such an optical interface module as shown in FIG. (2). FIG. (2) is a plan view showing another optical interface module according to the First Embodiment of the present invention.

Optical interface module (200) shown in FIG. (2) is the same as optical interface module (100) shown in FIG. (1A) except that two parallel grooves (217) are curved. In optical interface module (200) with such a structure, optical signals may also be transmitted from laser diode (22) in light-emitting section (20) to photodiode (32) in light-receiving section (30) by means of an optical waveguide.

In optical interface module (200), the reason grooves (217) are curved is as follows. In optical interface module (100) shown in FIG. (1A), when the light-emitting spot of laser diode (22) and the light-incidence spot of photodiode (32) are positioned on an extended line of the optical axis in first core part ($14A_1$), if second core part ($14A_2$) and third core part ($14A_3$) are formed in a straight line, in other words, if grooves (17) are formed in parallel straight lines, then laser diode (22) and core section (14A) and photodiode (32) may be optically connected.

On the contrary to such, when the light-emitting spot of laser diode (22) and the light-incidence spot of photodiode (32) are each shifted by ($L_1$) and ($L_2$) (see FIG. 2) in direction (X) from the extended line of the optical axis in the first core part, if the second core part and the third core part are formed in a straight line, then transmission loss will increase between laser diode (22) and the core section, or between the core section and photodiode (32). Therefore, in optical interface module (200), the grooves (217) are curved so that the second core part ($14A_2$) and third core part ($14A_3$) are outlined to reduce transmission loss. Accordingly, by curving grooves (217), namely, by forming the second core part ($14A_2$) and the third core part ($14A_3$) in a curved outline, optical signals may be transmitted below a specific level of transmission loss and below a specific bit error rate.

Next, a method for manufacturing an optical interface module according to the First Embodiment is described step by step with reference to the drawings. FIGS. (3-5), FIGS. (6A-6C), FIGS. (7A-7C), FIGS. (8A-8B), FIGS. (9A-9B), FIGS. (10A-10B) are either a cross-sectional view or a plan view to illustrate a method for manufacturing the First Embodiment of the present invention. Here, FIGS. (3-5), FIGS. (6A), (7A), (8A), (10A) and (10A) are cross-sectional views showing the same cross section as that taken at the (A-A) line in FIG. (1A). FIGS. (6B), (7B), (8B), (9B) and (10B) are plan views. FIGS. (6C) and (7C) are cross-sectional views showing the same cross section as that taken at the (B-B) line in FIG. (1A).

Figure 3:
Figure 4:

(1) Flexible polyimide substrate (12) is prepared as a starting material (see FIG. 3). On polyimide substrate (12), by applying a resin for forming clad, or by laminating a resin film for forming clad, lower clad layer (13) is formed (see FIG. 4).

(2) Next, on lower clad layer (13), a metal film made of copper, gold, aluminum, titanium, nickel, chrome or the like is formed by deposition or the like, an etching resist is formed on the metal film, which is exposed to light and developed, then etching and film-removing treatments are further conducted. Accordingly, alignment marks (18) are formed on lower clad layer (13) (see FIG. 6B). Alignment marks (18) will be the alignment basis in the later process. Alignment marks (18) may be formed on polyimide substrate (12). Also, the material for alignment marks (18) is not limited to metal, but resin may be used.

Figure 5:
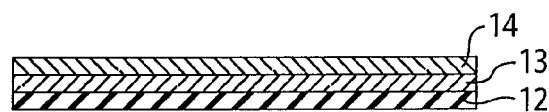
Figure 6A:
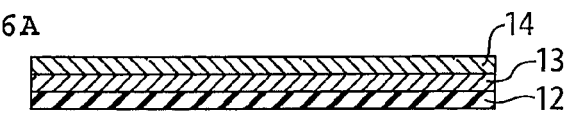

(3) Next, on the entire surface of lower clad layer (13), core layer (14) is formed by applying a resin for forming core or by laminating a resin film for forming core or the like (see FIG. 5). After that, two parallel grooves (15) are formed in part of core layer (14) (see FIGS. 6A, 6B and 6C). Specifically, an etching resist is first formed on core layer (14), which is then exposed to light and developed to make it a mask. The mask has openings in the areas corresponding to grooves (15). The positions to form such openings are determined based on alignment marks (18) formed on lower clad layer (13).

In the following, the portions (opening portions) of core layer (14) where the mask is not formed are removed using a reactive ion etching method to form two parallel grooves (15). After that, the mask is removed. By forming such two grooves (15), the area of core layer (14) sandwiched by grooves (15) becomes first core part ($14A_1$). Also, the areas outside grooves (15) become dummy cores (14B).

Figure 7A:
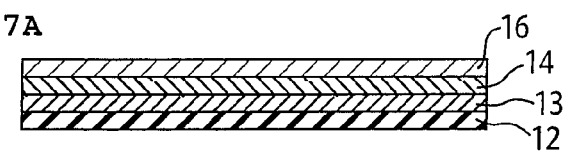
Figure 7B:
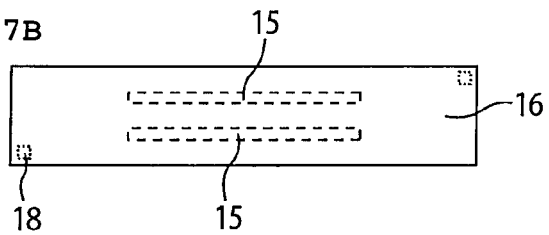
Figure 7C:
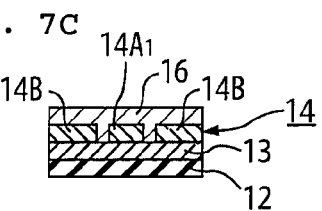

(4) Next, on core layer (14) where grooves (15) are formed, by applying a resin for forming clad or by laminating a resin film for forming clad, upper clad layer (16) is formed (see FIGS. 7A, 7B and 7C). During that time, a resin for forming clad also enters grooves (15), and the resin for forming clad that entered grooves (15) forms part of upper clad layer (16).

(5) Next, laser diode (22) is flip-chip mounted on rigid electrical substrate (21) via solder bumps (23); and photodiode (32) is also flip-chip mounted on rigid electrical substrate (31) via solder bumps (33). Here, alignment marks (25, 35) are formed in advance in laser diode (22) and photodiode (32) respectively. Based on those alignment marks and alignment marks (24, 34) on rigid electrical substrates (21, 31), laser diode (22) and photodiode (32) are mounted on rigid electrical substrates (21, 31) (see FIGS. 8A and 8B). In doing so, laser diode (22) and photodiode (32) may be mounted at predetermined spots. Also, laser diode (22) and photodiode (32) may be mounted using wire bonding, lead connection, pin connection, an anisotropic conductive adhesive agent or the like.

(6) Next, lower surfaces (12A) at both ends of polyimide substrate (12) are anchored to rigid electrical substrates (21, 31) through an adhesive layer (not shown in the drawings) (see FIGS. 9A and 9B). Polyimide substrate (12) and rigid electrical substrates (21, 31) are aligned based on alignment marks (18) formed on lower clad layer (13) and alignment marks (25, 35) of the laser diode and photodiode. At that time, the driver circuit of the laser diode and control circuits of the photodiode may already be loaded on rigid electrical substrates, or they may be loaded after polyimide substrate (12) is anchored to the rigid electrical substrates.

(7) Next, by laser processing, two parallel grooves (17) are formed in predetermined positions in upper clad layer (16) and core layer (14). At that time, grooves (17) are formed based on alignment marks (18) on lower clad layer (13) and alignment marks (25, 35) formed on laser diode (22) and photodiode (32) respectively (see FIGS. 10A and 10B). By forming two parallel grooves (17), the areas of core layer (14) sandwiched by grooves (17) become second core part ($14A_2$) and third core part ($14A_3$). Also, the areas outside grooves (17) become dummy cores (14B). Thus, dummy cores (14B) are formed along the sidewalls of core section (14A) while not touching the sidewalls of core section (14A). Here, laser processing may be conducted using an excimer laser, a carbon dioxide gas laser, an ultraviolet laser or the like.

In step (7), as described above, grooves (17) are formed by laser processing based on the positions where laser diode (22) and photodiode (32) are mounted. Thus, depending on the mounted positions of laser diode (22) and photodiode (32), as shown in FIGS. (10A, 10B), the areas of the core section sandwiched by grooves (17) may not make a straight line, but the outlines of the core section sandwiched by grooves (17) may be curved as shown in FIG. (2). Also, after grooves (17) are formed, a resin for forming clad may be filled in grooves (17) according to requirements. By taking such procedures, an optical interface module according to the present invention may be manufactured.

Also, in a manufacturing method described so far, the alignment marks were formed by conducting various treatments after forming a metal film in step (2); however, the alignment marks may be formed in the lower clad layer by a reactive ion etching method at the same time when forming grooves (15) in step (3).

According to a method for manufacturing an optical interface module of the First Embodiment, a core section (a first core part) is first formed only in part of the core layer, then based on the position where the first core part is formed and on the positions where a laser diode and photodiode are mounted, a second core part and a third core part are formed by laser processing to optically connect both elements. Accordingly, even if the anchored position of the polyimide substrate is shifted from the designed spot, since the second and third core parts are formed based on the actual anchored position (the actual position where the polyimide substrate is anchored relative to the laser diode and photodiode), an optical waveguide may be easily formed to optically connect the laser diode and the photodiode securely and precisely. Especially, when manufacturing multiple optical interface modules all at once, gaps may occur at a higher rate. However, even in such cases, optical waveguides may be easily installed to optically connect the laser diode and the photodiode securely and precisely.

Also, according to the method for manufacturing an optical interface module of the First Embodiment, a core section is formed by forming two parallel grooves by laser processing. Thus, the core section may be formed precisely, not only in cases where the core section is configured in a straight line in a planar view, but also in cases where the configuration of the core section is bent or curved in a planar view.

Also, according to the method for manufacturing an optical interface module of the First Embodiment, grooves (15) are formed by a reactive ion etching method, and grooves (17) are formed by laser processing. Therefore, the roughness of the sidewalls in the first core part sandwiched by grooves (15) is less than the roughness of the sidewalls in the second part and the third core part sandwiched by grooves (17). Accordingly, transmission loss in a unit length of the first core part is made less than the transmission loss in a unit length of the second core part. Therefore, according to the method for manufacturing an optical interface module of the First Embodiment, the length of each core section may be determined according to the transmission loss allowed for the entire optical interface module: If the transmission loss allowed for the entire optical interface module is small, then the length of the first core part may be lengthened; and if the transmission loss allowed for the entire optical interface module is great, then the length of the first core part may be shortened.

Also, according to the method for manufacturing an optical interface module of the First Embodiment, since dummy cores are formed in the core layer of an optical waveguide, when an upper clad layer is formed on the core layer, the top surface of the upper clad layer does not partially rise, sink or wave. Therefore, it is especially suitable to form by laser processing two parallel grooves that penetrate the core layer and upper clad layer so that a second core part and a third core part may be formed.

A little more detail concerning the above procedure will be described by referring to FIGS. (11A-11G) and FIGS. (12A-12G). FIG. (11A) is a plan view showing the laminate of a lower clad layer, a core layer in which only a first core part is formed, and an upper clad layer. FIG. (11B) is a cross-sectional view of the laminate seen from the (A-A) line in FIG. (11A). FIG. (11C) is a cross-sectional view of the laminate seen from the (B-B) line in FIG. (11A). FIG. (11D) is a cross-sectional view of the laminate seen from the (C-C) line in FIG. (11A). FIG. (11E) is a plan view of an optical waveguide where a second core and a third core are formed by forming two grooves by laser processing. FIG. (11F) is a cross-sectional view of the optical waveguide seen from the (D-D) line in FIG. (11E). FIG. (11G) is a cross-sectional view of the optical waveguide seen from the (E-E) line in FIG. (11E).

FIG. (12A) is a plan view showing the laminate of a lower clad layer, a core layer in which a first core part and dummy cores on both of its sides are formed, and an upper clad layer. FIG. (11B) is a cross-sectional view of the laminate seen from the (A-A) line in FIG. (12A). FIG. (12C) is a cross-sectional view of the laminate seen from the (B-B) line in FIG. (12A). FIG. (12D) is a cross-sectional view of the laminate seen from the (C-C) line in FIG. (12A). FIG. (12E) is a plan view of an optical waveguide where a second core and a third core are formed by forming two grooves by laser processing. FIG. (12F) is a cross-sectional view of the optical waveguide seen from the (D-D) line in FIG. (12E). FIG. (12G) is a cross-sectional view of the optical waveguide seen from the (E-E) line in FIG. (12E).

As shown in FIGS. (11A-11D), in laminate (51) where lower clad layer (53), core layer (54) and upper clad layer (56) are laminated in that order, only first core part ($54A_1$) is formed in core layer (54), and a dummy core is not formed on either side. Also, as shown in FIG. (11E), when two parallel grooves (57) are formed by laser processing, the cross-sections of grooves (57) taper off (tapering-off shape) as shown in FIGS. (11F, 11G). When grooves (57) are formed by laser processing, it is difficult to prevent the cross sections of grooves (57) from forming in such a way. Also, regardless of the processing spots, grooves (57) formed under the same laser processing conditions have the same depth.

Accordingly, in laminate (51) in which dummy cores are not formed as shown in FIGS. (11A-11D), the top surface of upper clad layer (56) is not made flat, but has varying heights; when two parallel grooves (57) are formed, and when the area sandwiched by grooves (57) is made a second core part or third core part ($54A_3$), the cross sections of the core section are configured differently depending on their spots. Namely, in the area of third core part ($54A_3$) sandwiched by grooves (57), width ($W_1$) (see FIG. 11F) of third core part ($54A_3$) which is closer to first core part ($54A_1$), differs from width ($W_2$) (see FIG. 11G) of third core part ($54A_3$) which is farther from first core part ($54A_1$). Situations in which the width of a core section varies depending on the spot occur not only in third core part ($54A_3$), but in the second part as well. Then, if the widths fluctuate in the continuous core parts, optical signals may not reflect but may leak at the boundary of the core and a clad layer, causing increasing transmission loss.

On the other hand, as shown in FIGS. (12A-12D), in laminate (61), lower clad layer (63), core layer (64) and upper clad layer (66) are laminated in that order, and dummy cores (64B) are formed on both sides of first core part ($64A_1$). When two pairs of parallel grooves (67) are formed by laser processing (see FIG. 12E) in laminate (61), the cross sections of grooves (67) taper off (tapering-off shape) as shown in FIGS. (12F, 12G); however, since the top surface of upper clad layer (66)

is made flat because of dummy cores (64B), widths ($W_3$, $W_4$) of third core part ($64A_3$) sandwiched by two parallel grooves (67) are substantially the same at any spot. The widths of a core part are the same at any spot not only in third core part ($64A_3$), but in the second core part as well. In such a case, since the widths of the continuous core parts do not fluctuate, an increase in transmission loss may not possibly occur.

As such, when second and third core parts are formed by making grooves using a laser, the top surface of the upper clad layer is preferred to be made flat so as to maintain low transmission loss. Thus, to level the top surface of an upper clad layer, it is preferred that dummy cores be formed.

An optical interface module according to the First Embodiment has dummy cores, thus the top surface of the optical waveguide is made flat. Accordingly, the cross sections of the core section are substantially the same in the entire optical path. Thus, an optical interface module with low transmission loss may be provided. Also, the structure of an optical interface module of the First Embodiment is suitable to be manufactured using the method for manufacturing an optical interface module according to the First Embodiment.

EXAMPLE 1

(1) Flexible polyimide substrate (12) with a thickness of 0.025 mm is prepared as a starting material (see FIG. 3). On polyimide substrate (12), perfluorinated polyimide resin (Luxvia PF-GAXX100038C, made by Nippon Shokubai Co., Ltd.) as a resin for forming clad is applied and cured under the conditions of 250° C. for an hour to form lower clad layer (13) with a thickness of 50 μm and a length of 10 cm (see FIG. 4). Here, the length of lower clad layer (13) indicates the length in direction (Z) in FIG. (1A).

Figure 6B:
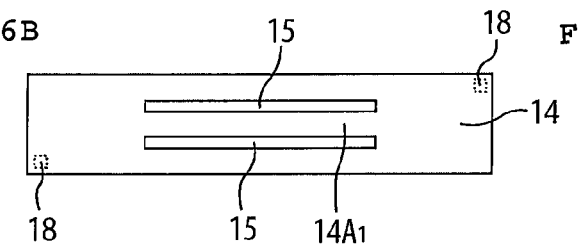
Figure 6C:
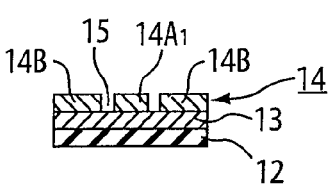

(2) A metal film (Au film) was formed by deposition on lower clad layer (13), and an etching resist was formed on the metal film, which was further exposed to light, developed and etched, and then the film was removed to form alignment marks (18) on lower clad layer (13) (see FIG. 6B).

(3) On the entire surfaces of lower clad layer (13), perfluorinated polyimide resin (Luxvia PF-GAXX100033C, made by Nippon Shokubai Co., Ltd.) as a resin for forming core was applied and cured under the conditions of 250° C. for an hour to form core layer (14) with a thickness of 50 μm (see FIG. 5).

(4) An etching resist was formed on core layer (14), which was then exposed to light and developed to make a mask with openings that correspond to the areas to form grooves (15) described below. The opening positions were determined based on alignment marks (18). After that, two parallel grooves (15) were formed in part of core layer (14) by a reactive ion etching method (see FIGS. 6A, 6B and 6C). The length of grooves (15) (the length in direction (Z) in FIG. 1A) was set at 9 cm. By forming two such grooves (15), the area of core layer (14) sandwiched by grooves (15) was made first core part ($14A_1$) and the areas of core layer (14) outside grooves (15) were made dummy cores (14B). Therefore, dummy cores (14B) are formed along the sidewalls of first core part ($14A_1$) while not touching the sidewalls of first core part ($14A_1$). Also, the width of first core part ($14A_1$) (the length in direction (X) in FIG. 1A) was set at 50 μm.

(5) Next, on core layer (14) where grooves (15) were formed, perfluorinated polyimide resin (Luxvia PF-GAXX100038C, made by Nippon Shokubai Co., Ltd.) as a resin for forming clad was applied and cured under the conditions of 250° C. for an hour to form upper clad layer (16) with a thickness of 50 μm (see FIGS. 7A, 7B and 7C). In the present process, by applying a resin for forming clad, the resin for forming clad was also filled in grooves (15).

(6) Next, laser diode (22) and its driver circuits (not shown in the drawings) were flip-chip mounted on rigid electrical substrate (21) via solder bumps (23); photodiode (32) and its control circuits (not shown in the drawings) were flip-chip mounted on rigid electrical substrate (31) via solder bumps (33) (see FIGS. 8A and 8B). During that time, rigid electrical substrate (21) and laser diode (22) were aligned based on alignment marks (24, 25); and rigid electrical substrate (31) and photodiode (32) were aligned based on alignment marks (34, 35).

(7) Next, lower surfaces (12A) at both ends of polyimide substrate (12) were anchored to rigid electrical substrates (21, 31) using an epoxy adhesive agent (not shown in the drawings) (see FIGS. 9A and 9B). During that time, polyimide substrate (12) and rigid electrical substrates (21, 31) were aligned based on alignment marks (18) formed on lower clad layer (13), as well as on alignment marks (25, 35) of the laser diode and the photodiode.

(8) Next, using a UV laser, two parallel grooves (17) were formed at the predetermined positions in upper clad layer (16) and core layer (14) (see FIGS. 10A and 10B). The length of grooves (17) in direction (Z) was 0.5 on the side of the laser diode as well as on the side of the photodiode. At that time, the positions for forming grooves (17) were determined based on alignment marks (18) and alignment marks (25, 35). By forming two such parallel grooves (17), the areas of core layer (14) sandwiched by grooves (17) were made second core part ($14A_2$) and third core part ($14A_3$) that are continuous to first core part ($14A_1$). In the present example, a laser diode and a photodiode were mounted at designed positions, and thus the entire core section (14A) was formed in a straight line. Through such processes, optical interface module (100) was completed.

On optical interface module (100) manufactured in Example (1), the entire transmission loss was measured; it was 15.0 dB. The transmission loss in the entire optical interface module (100) was measured using the following method. By taking into account the optical output power profile, which reflects radiation-angle dependent features of optical output power density, and the power consumption rate at the driver circuit of the laser diode, the optical output power of the laser diode is set at 1 mW (0 dBm). From the laser diode, an optical signal at 1 mW (0 dBm) enters the optical waveguide from its end, and the optical signal that is output from the other end of the optical waveguide is received at the photodiode. Since the power amount of received light is in relation to the photocurrent generated by the received light, and such a relationship can be figured out beforehand, the power (unit: mW or dBm) of light the photodiode received may be found by measuring the photo current.

Thus, using the below formula (1), the transmission loss (unit: dB) in the entire optical interface module was calculated.

entire transmission loss (dB)=−10 $\log_{10}$((optical output power (mW) of laser diode)/(received power (mW) of photodiode))=−10 $\log_{10}$((1 mW)/(received power (mW) of photodiode))  (1)

Also, in optical interface module (100) manufactured in Example (1), the bit error rate when transmitting a 1 Gbit/sec. optical signal was measured; it was $1 \times 10^{-13}$. The bit error rate was measured using the method below.

First, a voltage signal with a pseudo random bit sequence (PRBS) is input to the terminals of a flexible electrical substrate in the optical interface module, where the terminals are connected to input terminals of the driver circuit (driver) of the laser diode. The input voltage signal is converted to a current signal at the driver circuit (driver) of the laser diode, and then the current signal is converted to an optical signal at the laser diode. Then, the optical signal that is output from the laser diode is received at the photodiode by way of the optical waveguide, and is converted to a current signal. The current signal is converted to a voltage signal at the control circuits (preamplifier and comparator) of the photodiode and then output from the output terminals. Therefore, the voltage signal is detected from the pads of the flexible electrical substrate connected to the control circuits (preamplifier and comparator) of the photodiode, and is compared with the above input pseudo random bit sequence to calculate the bit error rate.

To detect the generated pseudo random bit sequence and the output voltage from the optical interface module, and then to compare both, a bit error rate tester (N4902B, made by Agilent Technologies, Inc.) was used.

EXAMPLE 2

An optical interface module was manufactured the same way as in Example (1), except that the positions to mount a laser diode and a photodiode were intentionally shifted by $L_1=L_2=200$ μm in direction (X) (see FIG. 2).

Therefore, the second and third core parts are curved as the optical interface module shows in FIG. (2). That was intended according to the optical interface module manufactured in Example (1) where the actual mounted positions of the laser diode and photodiode were shifted from the designed positions.

Also, regarding optical interface module (100) manufactured in Example (2), the transmission loss and the bit error rate when transmitting a 1 Gbit/sec. optical signal were measured. The results were 15.5 dB and $1\times10^{-12}$ respectively.

Using optical interface module (100) manufactured in Example (1), when trying to transmit a 1 Gbit/sec. optical signal under a bit error rate of $1\times10^{-12}$, the allowed transmission loss for the entire optical interface module is 15.5 dB. Compared with that, in Example (2), where the mounted positions of the laser diode and photodiode were intentionally shifted from an optical axis by $L_1=L_2=200$ μm in direction (X) (see FIG. 2), the entire transmission loss and bit error rate when transmitting a 1 Gbit/sec. optical signal were 15.5 dB and $1\times10^{-12}$ respectively.

Furthermore, if the mounted positions of the laser diode and the photodiode are shifted in direction (X) by more than 200 μm, the radii of the curve in the second and third core parts become smaller in places, and thus more components of the optical signal cannot be reflected entirely at the boundary of core and clad layers. Therefore, the transmission loss in the entire optical interface module becomes greater than 15.5 dB. Accordingly, the bit error rate when transmitting a 1 Gbit/sec. optical signal is greater than $1\times10^{-12}$.

Namely, Example (2) is an example of a laser diode and a photodiode, which can transmit a 1 Gbit/sec. optical signal with a bit error rate under $1\times10^{-12}$, where the mounted positions of the laser diode and the photodiode were shifted as far as possible in direction (X) (see FIG. 2). It indicates that when transmitting a 1 Gbit/sec. optical signal with a bit error rate under $1\times10^{-12}$, the tolerable gaps in direction (X) to mount a laser diode and photodiode were 200 μm respectively.

Also, for comparison purposes, an optical interface module was manufactured using a method for manufacturing an optical interface module according to Example (1), except that second and third core parts were not formed, but the core section of an optical waveguide was made up only of a first core part (the core section sandwiched by grooves (15) formed by a reactive ion etching method). Then, regarding such an optical interface module, tolerable gaps for the laser diode and photodiode were calculated using the same method as above. As a result, a tolerable gap in direction (X) for the laser diode was 31 μm, and a tolerable gap in direction (X) for the photodiode was 48 μm.

As such, by forming second and third core parts based on the mounted positions of a laser diode and a photodiode, tolerable gaps for mounting the laser diode and photodiode may be increased. Namely, in Example (2), a laser diode and a photodiode are mounted, and then second and third core parts are formed by laser processing based on the positions of the laser diode and photodiode to complete the entire core section. Thus, even if the mounted positions of the laser diode and photodiode are shifted substantially from the designed positions, according to the actual mounted positions of the laser diode and photodiode, second and third core parts may be formed precisely by laser processing. Therefore, even if the mounted positions of the laser diode and photodiode are shifted substantially from the designed positions, an optical interface module may be manufactured in which the transmission loss of an optical signal is low between the laser diode and photodiode via the core section of an optical waveguide.

COMPARATIVE EXAMPLE 1

Figure 13A:
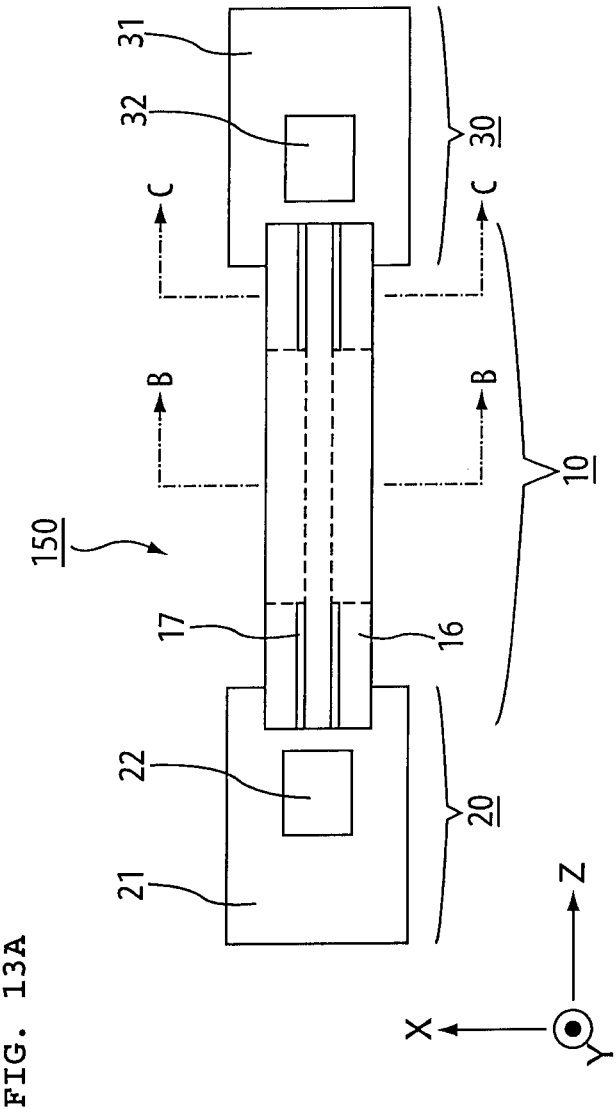
Figure 13B:
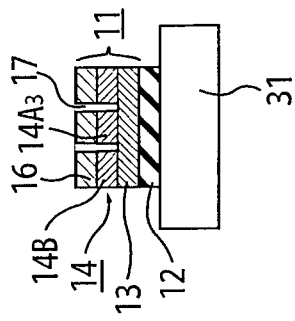
Figure 13C:
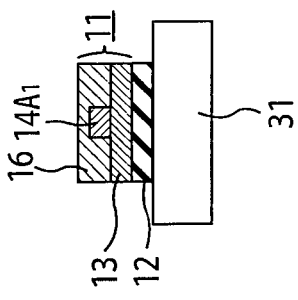
Figure 14C:
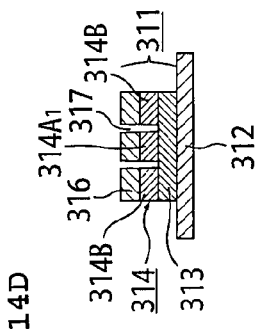
Figure 14D:
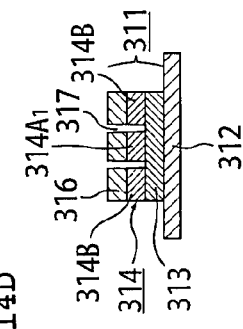
Figure 14A:
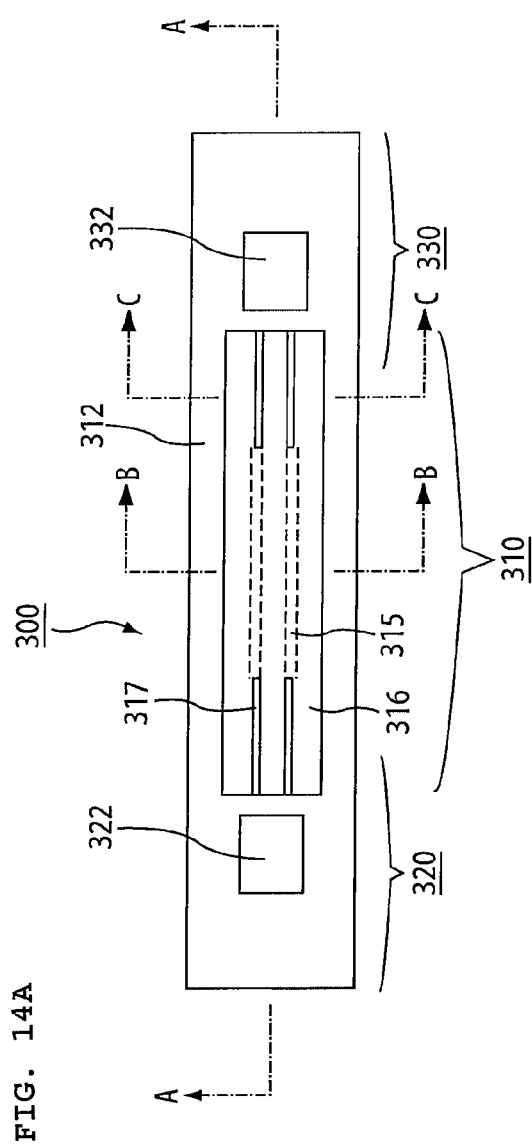
Figure 14B:
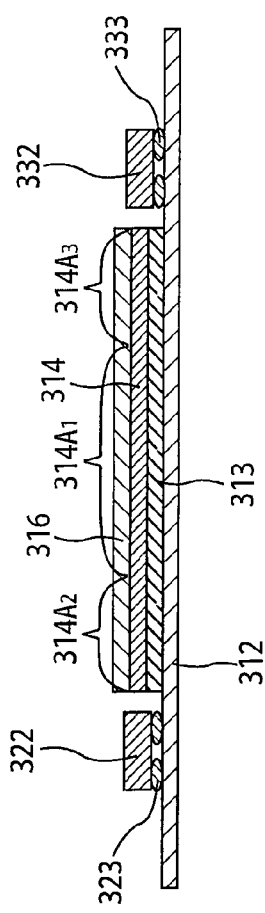
Figure 15:
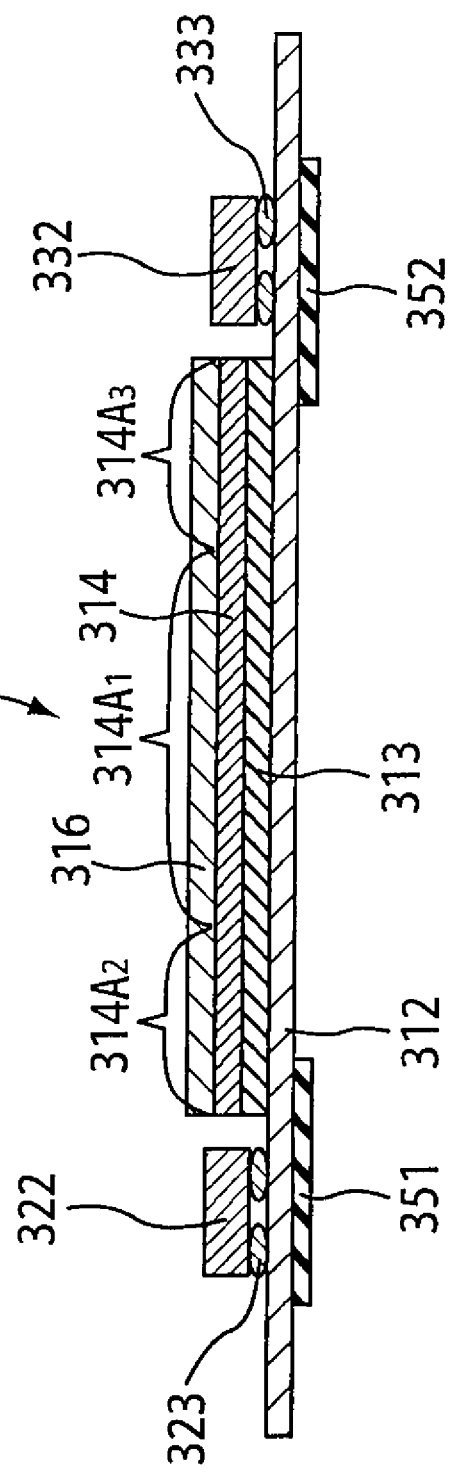
Figure 16:
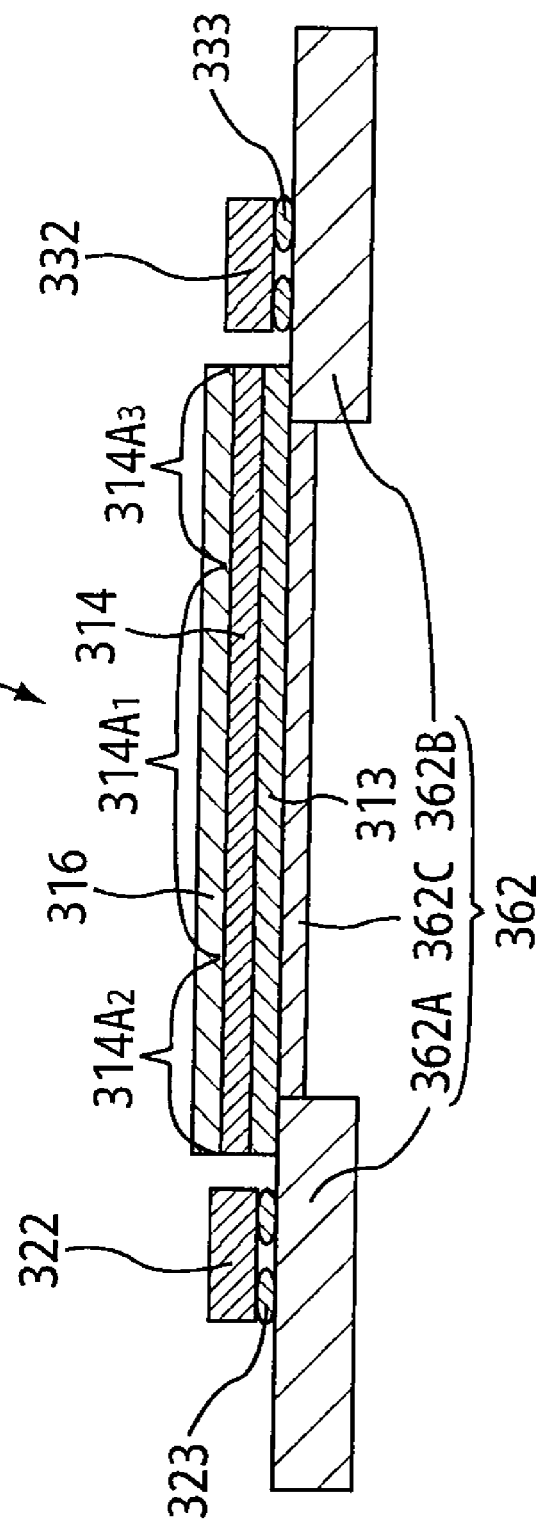

Optical interface module (150) was completed as in Example (1), except that only first core part ($14A_1$) was formed, and dummy core (14B) was not formed on either side of the first core part in step (4) of Example (1) (see FIGS. 13A, 13B and 13C).

Accordingly, optical interface module (150) of Comparative Example (1) has the same structure as in an optical interface module of Example (1), except that a dummy core is not formed on either side of the first core part as shown in FIGS. (13A-13C).

The entire transmission loss in the optical interface module manufactured in Comparative Example (1) was 16.5 dB; and the bit error rate when transmitting a 1 Gbit/sec. optical signal was $1\times10^{-10}$.

COMPARATIVE EXAMPLE 2

An optical interface module was completed as in Example (2), except that only first core part ($14A_1$) was formed and dummy core (14B) was not formed on either side of the first core part.

Therefore, in an optical interface module in Comparative Example (2), second and third core parts are curved the same way as in Example (2).

The entire transmission loss in the optical interface module manufactured in Comparative Example (2) was 17.0 dB; and the bit error rate when transmitting a 1 Gbit/sec. optical signal was $1\times10^{-9}$.

Entire transmission losses and bit error rates when transmitting a 1 Gbit/sec. optical signal in optical interface modules according to Examples (1, 2) and Comparative Examples (1, 2) are shown in Table (1).

TABLE 1

|  | Example 1 | Example 2 | Comp. Examp. 1 | Comp. Examp. 2 |
|---|---|---|---|---|
| entire transmission loss (dB) of optical interface module | 15.0 | 15.5 | 16.5 | 17.0 |
| bit error rate when 1 Gbit/sec. optical signal is transmitted | $1\times10^{-13}$ | $1\times10^{-12}$ | $1\times10^{-10}$ | $1\times10^{-9}$ |

As shown, entire transmission losses and bit error rates of optical interface modules in Examples (1, 2) were small compared with those in optical interface modules in Comparative Examples (1, 2). That is thought to be because dummy cores were formed in the core layers of optical interface modules in Examples (1, 2).

Second Embodiment

An optical interface module according to the Second Embodiment is described herewith reference to the drawings. FIG. (14A) is a plan view of an optical interface module according to the Second Embodiment of the present invention. FIG. (14B) is a cross-sectional view of the optical interface module seen from the A-A line in FIG. (14A); FIG. (14C) is a cross-sectional view of the optical interface module seen from the B-B line in FIG. (14A); and FIG. (14D) is a cross-sectional view of the optical interface module seen from the C-C line in FIG. (14A).

As shown in FIGS. (14A-14D), optical interface module (300) of the Second Embodiment has optical wiring section (310) in which optical waveguide (311) is formed on flexible electrical substrate (312), light-emitting section (320) where laser diode (322) is mounted, and light-receiving section (330) where photodiode (332) is mounted.

Optical waveguide (311) has lower clad layer (313), core layer (314) and upper clad layer (316), which are made of resin, each layer being laminated on flexible electrical substrate (312) in that order.

In addition, in optical waveguide (311), two parallel grooves (315, 317) are formed in part of core layer (314). In core layer (314), the area sandwiched by two grooves (315) and the area sandwiched by two grooves (317) are core section (314A), which becomes an actual optical path. More specifically, the core portion sandwiched between two grooves (315) is first core part ($314A_1$), and the core portion sandwiched between two grooves (317) is either second core part ($314A_2$) or third core part ($314A_3$). Also, the areas outside grooves (315, 317) are dummy cores (314B) which are not actual optical paths. Also, as shown in FIG. (14C), the same resin as in upper clad layer (316) is filled in grooves (315). Also, as shown in FIG. (14D), grooves (317) are empty, and are formed to penetrate core layer (314) and upper clad layer (316).

In light-emitting section (320), on flexible electrical substrate (312) having electrical circuits, laser diode (322) is flip-chip mounted using solder bumps (323), and a driver circuit (driver), not shown in the drawings, of laser diode (322) is loaded. In light-receiving section (330), on flexible electrical substrate (312) having electrical circuits, photodiode (332) is flip-chip mounted using solder bumps (333), and control circuits (preamplifier and comparator), not shown in the drawings, of photodiode (332) are loaded.

In optical interface module (300), an optical signal may be transmitted from laser diode (322) in light-emitting section (320) to photodiode (332) in light-receiving section (330) through optical waveguide (311) (core section 314A).

The example optical interface module (300) of the Second Embodiment is different from the example optical interface module (100) of the First Embodiment only in that a substrate to form an optical waveguide, a substrate to mount a laser diode, and a substrate to mount a photodiode form one flexible electrical substrate (312) (first substrate).

Also, an optical interface module of the Second Embodiment may be manufactured using the same method as the one to manufacture an optical interface module of the First Embodiment, except for the changes below. Namely, instead of polyimide substrate (12), flexible electrical substrate (312) is prepared as a starting material. Then, an optical interface module may be manufactured using the same method for manufacturing an optical interface module of the First Embodiment, except that step (6) of the method for manufacturing an optical interface module of the First Embodiment is not conducted.

Also, in an optical interface module according to the Second Embodiment, the same as in an optical interface module according to the First Embodiment, the entire core section is not necessarily formed in a straight line, but part of it may be bent or curved. Namely, in an optical interface module according to the Second Embodiment, for example, second and third core parts may be curved, as in optical interface module (200) shown in FIG. (2), so as to correspond to the actual mounted positions of the light-emitting element and the light-receiving element.

Also, in an optical interface module according to the Second Embodiment, a reinforcing plate may be formed on the second surface (the surface opposite the surface on which an optical waveguide is formed) of flexible electrical substrate (312). Such a reinforcing plate is preferred to be formed in the region that includes the area directly under the laser diode, and also in the region that includes the area directly under the photodiode. Especially, as in optical interface module (400) shown in FIG. (15), reinforcing plate (351) is preferred to be formed in the region that includes laser diode (322) and the area directly under the end of second core ($314A_2$) which faces laser diode (322); and reinforcing plate (352) is preferred to be formed in the region that includes photodiode (332) and the area directly under the end of third core ($314A_3$) which faces photodiode (332).

By forming such reinforcing plates, an optical signal may be securely transmitted between laser diode (322) and second core part ($314A_2$), and between photodiode (332) and third core part ($314A_3$). That is because even if an optical interface module is warped during its use, since the areas having reinforcing plates do not warp, the positions of a laser diode and photodiode relative to the core section do not change. The structure of an optical interface module shown in FIG. (15) is the same as that of optical interface module (300) shown in FIGS. (14A-14D), except that reinforcing plates are formed therein.

Also, instead of flexible electrical substrate (312), an optical interface module according to the Second Embodiment may have rigid-flexible electrical substrate (362) which is made up of a rigid section and a flexible section as in optical interface module (500) shown in FIG. (16). The optical interface module shown in FIG. (16) is the same optical interface module shown in FIG. (14B), except that it has a rigid-flexible electrical substrate instead of a flexible electrical substrate. As for the substrates to form an optical waveguide, or to mount laser diode (322) and photodiode (332), optical interface module (500) shown in FIG. (16) has rigid-flexible electrical substrate (362), which is made up of rigid sections (362A, 362B) formed in two areas, and flexible section (362C) that connects rigid sections (362A, 362B).

Laser diode (322) is mounted on rigid section (362A); photodiode (332) is mounted on rigid section (362B); and an optical waveguide is formed on flexible section (362C). Furthermore, the optical waveguide is formed in such a way that an end of second core part ($314A_2$) facing laser diode (322) is positioned on rigid section (362A), and an end of second core part ($314A_3$) facing photodiode (332) is positioned on rigid section (362B). The structure of optical interface module (500) is the same as that of optical interface module (300)

shown in FIGS. (14A-14D), except that it has rigid-flexible electrical substrate (362) instead of flexible electrical substrate (312).

By using such a rigid-flexible electrical substrate, an optical signal may be securely transmitted between laser diode (322) and second core part (314A$_2$), and between photodiode (332) and third core part (314A$_3$). That is because even if an optical interface module is warped during its use, since the rigid sections do not warp, the positions of the laser diode and photodiode relative to the core section do not change.

Such an optical interface module according to the Second Embodiment may have the same effects as an optical interface module according to the First Embodiment. Also, the structure of an optical interface module of the Second Embodiment is especially suitable for making it compact and reducing costs.

Other Embodiments

In optical interface modules according to the First and Second Embodiments, parts of the core layer work as dummy cores. However, in an optical interface module according to an embodiment of the present invention, dummy cores do not have to be formed using part of the core layer; dummy cores made of a different material that have substantially the same height may be attached separately. Namely, as long as dummy cores have substantially the same height as the core section and are formed without touching the sidewalls of the core section, they may function as dummy cores.

The distance between the core section and the dummy core is preferred to be set in the range of approximately 50 to approximately 200 µm. If their distance is within such a range, the effect of forming dummy cores may be sufficiently acknowledged, and it is also easier to form dummy cores.

In a method for manufacturing an optical interface module according to the First Embodiment and the Second Embodiment, the grooves to form a first core part are formed using a reactive ion etching method; however, a method for forming grooves to form a first core part is not limited to a reactive ion etching method, but a method, for example, exposure to light and developing, routing, dicing or the like may also be employed.

In an embodiment of the present invention, a light-emitting element is not limited to laser diodes; a light-emitting diode, for example, may be used. Also, in an embodiment of the present invention, a laser diode is preferred to be an edge-emitting type; and a photodiode is preferred to be an edge-receiving type. Also, the above laser diode may be a single-mode emitting type or a multimode-emitting type; and according to the mode of a laser diode, an optical waveguide may also be single mode or multimode.

Polyimide substrate (12) to structure optical interface module (100) of the First Embodiment, and electrical substrate (312) structuring optical interface module (300) of the Second Embodiment are flexible substrates. However, those substrates are not limited to be flexible substrates, but they may be rigid substrates.

In an optical interface module according to an embodiment of the present invention, as for a resin for forming clad or a resin for forming core, other than epoxy resin, for example, acrylic resin, polyimide resin, poly-olefine resin or the like may be used.

Optical interface modules according to the embodiments of the present invention may be used preferably in various equipment, for example, cell phones, personal computers, digital video cameras, digital cameras, CCD modules, liquid crystal panels and so forth.

Obviously, numerous modifications and variations of the present invention are possible in light of the above teachings. It is therefore to be understood that within the scope of the appended claims, the invention may be practiced otherwise than as specifically described herein.

What is claimed is:

1. A method for manufacturing an optical interface module, comprising:
    forming a lower clad layer on a first surface of a substrate, which is opposite to a second surface of the substrate;
    forming a core layer on the lower clad layer;
    forming a first core part having one end and an other end by forming a first set of two grooves in a part of the core layer, the first core part being between the two grooves;
    forming an upper clad layer on the core layer and in the first set of two grooves;
    mounting a light-emitting element on the first surface of the substrate;
    mounting a light-receiving element on the first surface of the substrate;
    forming a second core part which is optically coupled to the light-emitting element and to the one end of the first core part respectively, by forming a second set of two grooves by laser processing in the upper clad layer and the core layer between the light-emitting element and the one end of the first core part; and
    forming a third core part which is optically coupled to the light-receiving element and the other end of the first core part respectively, by forming a third set of two grooves by laser processing in the upper clad layer and the core layer between the light-receiving element and the other end of the first core part.

2. The method according to claim 1, wherein the substrate is a flexible substrate.

3. The method according to claim 2, further comprising:
    forming a first reinforcing plate on a region of the second surface of the flexible substrate that includes the area directly under the light-emitting element, and forming a second reinforcing plate on a region of the second surface of the flexible substrate that includes the area directly under the light-receiving element.

4. The method according to claim 3, wherein:
    the second core part has a first end optically connected to one end of the first core part and a second end optically connected to the light-emitting element,
    the third core part has a third end optically connected to the other end of the first core part, and a fourth end optically connected to the light-receiving element,
    the first reinforcing plate is formed in the region that includes the area directly under the light-emitting element and the area directly under the second end, and
    the second reinforcing plate is formed in the region that includes the area directly under the light-receiving element and the area directly under the fourth end.

5. The method according to claim 1, wherein the substrate is a rigid-flex substrate that has at least one rigid section and a flexible section, the method further comprising:
    mounting each of the light-emitting element and the light-receiving element on the at least one rigid section, and forming at least the lower clad layer in the flexible section.

6. The method according to claim 5, wherein the second core part has a first end optically connected to the one end of the first core part and a second end optically connected to the light-emitting element, the method further comprising:
    positioning the second end on the rigid section on which the light-emitting element is mounted.

7. The method according to claim 5, wherein the third core part has a third end optically connected to the other end of the first core part and a fourth end optically connected to the light-receiving element, the method further comprising:

positioning the fourth end on the rigid section on which the light-receiving element is mounted.

8. A method for manufacturing an optical interface module, comprising:

forming a lower clad layer on a flexible substrate;
forming a core layer on the lower clad layer;
forming a first core part having one end and an other end, by forming a first set of two grooves in a part of the core layer, the first core part being between the two grooves;
forming an upper clad layer on the core layer and in the first set of two grooves;
mounting a light-emitting element on a first rigid substrate;
mounting a light-receiving element on a second rigid substrate;
adhering the first rigid substrate and the second rigid substrate to the flexible substrate;
forming a second core part which is optically coupled to the light-emitting element and to the one end of the first core part respectively by forming a second set of two grooves by laser processing in the upper clad layer and the core layer between the light-emitting element and the one end of the first core part; and
forming a third core part which is optically coupled to the light-receiving element and the other end of the first core part respectively by forming a third set of two grooves by laser processing in the upper clad layer and the core layer between the light-receiving element and the other end of the first core part.

9. The method according to claim 8, wherein the second core part has a first end optically connected to one end of the first core part and a second end optically connected to the light-emitting element, the method further comprising:

positioning the second end on the first rigid substrate.

10. The method according to claim 8, wherein the third core part has a third end optically connected to the other end of the first core part and a fourth end optically connected to the light-receiving element, the method further comprising:

positioning the fourth end on the second rigid substrate.

11. An optical interface module, comprising:

a substrate;
a lower clad layer formed on the substrate;
a three-dimensional core section formed on the lower clad layer and having a first sidewall and a second sidewall opposite to the first sidewall;
a first resin layer formed on the lower clad layer along the first sidewall of the core section and not touching the first sidewall so as to form a first gap;
a second resin layer formed on the lower clad layer along the second sidewall of the core section and not touching the second sidewall so as to form a second gap;
an upper clad layer formed on the core section, on the first resin layer, on the second resin layer, in at least part of the first gap between the core section and the first resin layer, and in at least part of the second gap between the core section and the second resin layer;
a light-emitting element mounted on the substrate and optically coupled to the core section; and
a light-receiving element mounted on the substrate and optically coupled to the core section, wherein:
the core section comprises a first core part, a second core part and a third core part, the first core part being between the second and third core parts, and
a transmission loss in a unit length of the first core part is smaller than a transmission loss in a unit length of the second core part and smaller than a transmission loss in a unit length of the third core part.

12. The optical interface module according to claim 11, wherein the substrate comprises a rigid-flex substrate comprising:

a flexible portion; and
rigid portions extending from opposing ends of the flexible portion to form a substantially planar surface of the rigid-flex substrate, wherein said lower clad layer, said light-emitting element and said light receiving element are formed on the substantially planar surface of the rigid-flex substrate.

13. The optical interface module according to claim 11, wherein the substrate comprises:

a flexible substrate;
a first rigid substrate adhered to a first end of the flexible substrate, the light-emitting element mounted on the first rigid substrate; and
a second rigid substrate adhered to a second end of the flexible substrate which is opposite to the first end of the flexible substrate, the light-receiving element mounted on the second rigid substrate.

14. The optical interface module according to claim 13, wherein a top surface of the first resin layer, a top surface of the second resin layer and a top surface of the core section are substantially on a same level.

15. The optical interface module according to claim 11, wherein a material for the first resin layer and the second resin layer is the same as the material for the core section.

16. The optical interface module according to claim 13, wherein a material for the first resin layer and the second resin layer is the same as the material for the core section.

17. The optical interface module according to claim 11, wherein a roughness of the sidewall of the first core part is less than a roughness of the sidewalls of the second core part and the third core part.

18. The optical interface module according to claim 13, wherein a roughness of the sidewall of the first core part is less than a roughness of the sidewalls of the second core part and the third core part.

19. The optical interface module according to claim 11, wherein:

the substrate comprises a single flexible substrate having a first surface and a second surface opposite to the first surface, and
said lower clad layer, said light-emitting element and said light receiving element are formed on the first surface of the substrate.

20. The optical interface module according to claim 19, further comprising:

a first reinforcing plate formed on a region of the second surface of the flexible substrate that includes the area directly under the light-emitting element; and
a second reinforcing plate formed on a region of the second surface of the flexible substrate that includes the area directly under the light-receiving element.

* * * * *